(12) United States Patent
McKie et al.

(10) Patent No.: US 9,835,353 B2
(45) Date of Patent: Dec. 5, 2017

(54) ENERGY RECOVERY VENTILATOR UNIT WITH OFFSET AND OVERLAPPING ENTHALPY WHEELS

(75) Inventors: Justin McKie, Frisco, TX (US); Eric Perez, Hickory Creek, TX (US); Bryan Smith, Little Elm, TX (US); Steve Schneider, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 1106 days.

(21) Appl. No.: 13/274,530

(22) Filed: Oct. 17, 2011

(65) Prior Publication Data

US 2013/0092346 A1    Apr. 18, 2013

(51) Int. Cl.
| | |
|---|---|
| F23L 15/02 | (2006.01) |
| F24H 3/02 | (2006.01) |
| F28D 7/00 | (2006.01) |
| F28F 9/22 | (2006.01) |
| F24F 11/00 | (2006.01) |
| F24F 7/06 | (2006.01) |
| F24F 7/007 | (2006.01) |
| F24F 13/00 | (2006.01) |
| F24F 12/00 | (2006.01) |
| F28D 19/04 | (2006.01) |

(52) U.S. Cl.
CPC .......... *F24F 12/001* (2013.01); *F28D 19/042* (2013.01); *F24F 2203/104* (2013.01); *Y02B 30/563* (2013.01); *Y10T 29/4935* (2015.01)

(58) Field of Classification Search
CPC .. F24F 2203/104; F24F 12/001; F28D 19/042
USPC .............. 165/7, 8, 160, 54; 454/239, 240
See application file for complete search history.

(56) References Cited

U.S. PATENT DOCUMENTS

| | | | |
|---|---|---|---|
| 1,094,309 A | | 4/1914 | Daw |
| 2,576,140 A | * | 11/1951 | Pennington ............... 62/314 |
| 3,252,508 A | | 5/1966 | Goettl |
| 3,889,742 A | | 6/1975 | Rush et al. |
| 4,018,266 A | | 4/1977 | Kay |
| 4,060,913 A | | 12/1977 | Yoshida et al. |
| 4,086,781 A | * | 5/1978 | Brody ............... F24F 11/04 165/250 |
| 4,228,849 A | | 10/1980 | Heinola |
| 4,342,359 A | | 8/1982 | Baker |

(Continued)

FOREIGN PATENT DOCUMENTS

EP        0663572 A2 *  7/1995 ......... B60H 1/00371

OTHER PUBLICATIONS

2006 Penbarry product catalog entitled, "Penberry-Energy Recovery Products".*

(Continued)

*Primary Examiner* — Len Tran
*Assistant Examiner* — Paul Alvare (57) ABSTRACT

An energy recovery ventilator cabinet containing a plurality of enthalpy wheels. The enthalpy wheels are substantially perpendicular to a stream of forced air, allowing the air to pass through the wheels. The enthalpy wheels are also disposed such that portions overlap, allowing multiple enthalpy wheels to be disposed in a smaller space than if the enthalpy wheels were placed side by side. This arrangement has led to energy recovery effectiveness similar to that obtained by a larger, single enthalpy wheel, but has the advantage of using less space.

11 Claims, 6 Drawing Sheets

(56) References Cited

U.S. PATENT DOCUMENTS

| | | | |
|---|---|---|---|
| 4,497,361 A | 2/1985 | Hajicek | |
| 4,513,809 A * | 4/1985 | Schneider | F24F 12/001 165/54 |
| 4,611,653 A | 9/1986 | Ikemura et al. | |
| 4,727,931 A | 3/1988 | Berner | |
| 4,754,651 A | 7/1988 | Shortridge et al. | |
| 4,784,212 A | 11/1988 | Brimer et al. | |
| 4,825,936 A | 5/1989 | Hoagland et al. | |
| 4,834,004 A | 5/1989 | Butuk et al. | |
| 4,841,733 A | 6/1989 | Dussault et al. | |
| 4,843,838 A | 7/1989 | Trask | |
| 4,854,726 A | 8/1989 | Lesley et al. | |
| 4,873,649 A | 10/1989 | Grald et al. | |
| 5,062,280 A | 11/1991 | Martin | |
| 5,069,272 A | 12/1991 | Chagnot | |
| 5,173,922 A | 12/1992 | Arakawa et al. | |
| 5,183,098 A | 2/1993 | Chagnot | |
| 5,238,052 A | 8/1993 | Chagnot | |
| 5,316,073 A | 5/1994 | Klaus et al. | |
| 5,353,606 A * | 10/1994 | Yoho et al. | 62/271 |
| 5,372,182 A | 12/1994 | Gore | |
| 5,376,045 A | 12/1994 | Kiser | |
| 5,423,187 A | 6/1995 | Fournier | |
| 5,482,108 A | 1/1996 | Essle et al. | |
| 5,497,823 A | 3/1996 | Davis | |
| 5,515,909 A | 5/1996 | Tanaka | |
| 5,564,626 A | 10/1996 | Kettler et al. | |
| 5,726,424 A | 3/1998 | Koether | |
| 5,728,289 A | 3/1998 | Kirchnavy et al. | |
| 5,761,908 A | 6/1998 | Oas et al. | |
| 5,826,641 A | 10/1998 | Bierwirth et al. | |
| 5,839,096 A | 11/1998 | Lyons et al. | |
| 5,927,096 A | 7/1999 | Piccione | |
| 6,009,763 A | 1/2000 | Berckmans et al. | |
| 6,039,109 A | 3/2000 | Chagnot et al. | |
| 6,209,622 B1 | 4/2001 | Lagace et al. | |
| 6,223,544 B1 | 5/2001 | Seem | |
| 6,289,974 B1 | 9/2001 | DeGregoria et al. | |
| 6,328,095 B1 | 12/2001 | Felber et al. | |
| 6,355,091 B1 | 3/2002 | Felber et al. | |
| 6,415,616 B1 | 7/2002 | Kim | |
| 6,575,228 B1 | 6/2003 | Ragland et al. | |
| 6,672,627 B1 | 1/2004 | Mariman et al. | |
| 6,776,708 B1 | 8/2004 | Daoutis et al. | |
| 6,925,999 B2 | 8/2005 | Hugghins et al. | |
| 6,929,057 B1 | 8/2005 | Sahota et al. | |
| 7,012,516 B2 | 3/2006 | Laurosch et al. | |
| 7,073,566 B2 | 7/2006 | Lagace et al. | |
| 7,090,000 B2 | 8/2006 | Taylor | |
| 7,100,634 B2 | 9/2006 | Robb et al. | |
| 7,150,314 B2 * | 12/2006 | Moffitt | F24F 12/001 165/249 |
| 7,231,967 B2 * | 6/2007 | Haglid | B25B 27/0035 165/231 |
| 7,308,384 B2 | 12/2007 | Shah et al. | |
| 7,440,864 B2 | 10/2008 | Otto | |
| 7,458,228 B2 | 12/2008 | Lagace et al. | |
| 7,581,408 B2 * | 9/2009 | Stark | F24F 3/153 62/93 |
| 7,716,936 B2 | 5/2010 | Bailey et al. | |
| 7,841,381 B2 | 11/2010 | Chagnot et al. | |
| 7,856,289 B2 | 12/2010 | Schanin et al. | |
| 7,886,986 B2 | 2/2011 | Fischer, Jr. et al. | |
| 8,123,518 B2 | 2/2012 | Nordberg et al. | |
| 2002/0139514 A1 | 10/2002 | Lagace et al. | |
| 2002/0153133 A1 | 10/2002 | Haglid | |
| 2003/0085814 A1 | 5/2003 | Griep | |
| 2003/0140638 A1 | 7/2003 | Arshansky et al. | |
| 2003/0178411 A1 | 9/2003 | Manganiello et al. | |
| 2004/0155466 A1 | 8/2004 | Sodemann et al. | |
| 2005/0236150 A1 | 10/2005 | Chagnot et al. | |
| 2005/0252229 A1 | 11/2005 | Moratalla | |
| 2006/0035580 A1 | 2/2006 | Anderson et al. | |
| 2006/0054302 A1 * | 3/2006 | Cho | F23L 15/02 165/8 |
| 2006/0219381 A1 | 10/2006 | Lagace et al. | |
| 2007/0045439 A1 | 3/2007 | Wolfson | |
| 2007/0045601 A1 | 3/2007 | Rhee | |
| 2007/0144187 A1 | 6/2007 | Lee | |
| 2007/0171647 A1 | 7/2007 | Artwohl et al. | |
| 2007/0205297 A1 * | 9/2007 | Finkam | F24F 11/001 236/1 C |
| 2008/0006396 A1 * | 1/2008 | Upadhya | F28F 9/262 165/121 |
| 2008/0033599 A1 | 2/2008 | Aminpour et al. | |
| 2008/0076346 A1 | 3/2008 | Ahmed | |
| 2008/0144238 A1 | 6/2008 | Cline et al. | |
| 2008/0208531 A1 | 8/2008 | Felcman et al. | |
| 2008/0282494 A1 | 11/2008 | Won et al. | |
| 2009/0032604 A1 | 2/2009 | Miller | |
| 2009/0090117 A1 | 4/2009 | McSweeney | |
| 2009/0095096 A1 | 4/2009 | Dean et al. | |
| 2009/0120111 A1 | 5/2009 | Taras et al. | |
| 2009/0156966 A1 | 6/2009 | Kontschieder et al. | |
| 2009/0165644 A1 | 7/2009 | Campbell | |
| 2009/0215375 A1 | 8/2009 | Hagensen | |
| 2009/0222139 A1 | 9/2009 | Federspiel | |
| 2010/0262298 A1 | 10/2010 | Johnson et al. | |
| 2013/0087302 A1 | 4/2013 | McKie et al. | |
| 2013/0090051 A1 | 4/2013 | McKie et al. | |
| 2013/0090769 A1 | 4/2013 | McKie et al. | |
| 2013/0092344 A1 | 4/2013 | McKie et al. | |
| 2013/0092345 A1 | 4/2013 | McKie et al. | |
| 2013/0095744 A1 | 4/2013 | McKie et al. | |
| 2013/0118188 A1 | 5/2013 | McKie et al. | |
| 2013/0158719 A1 | 6/2013 | McKie et al. | |

OTHER PUBLICATIONS

Translation of German Patent Document EP 0663572 A2 entitled Translation—EP 0663572 A2, translated Dec. 2015.*
Lennox Engineering Data, Indoor Air Quality ERV Energy Recovery Ventilator 60 HZ, Bulletin No. 210245, Mar. 2010, 20 pages.
ANSI/AHRI Standard 1060, 2005 Standard for Performance Rating of Air-to-Air Exchangers for Energy Recovery Ventilation, 13 pages.

* cited by examiner

ENERGY RECOVERY VENTILATOR UNIT WITH OFFSET AND OVERLAPPING ENTHALPY WHEELS

CROSS-REFERENCE TO RELATED APPLICATIONS

The present application is related to U.S. patent application Ser. No. 13/274,562 by McKie et al., entitled, "A TRANSITION MODULE FOR AN ENERGY RECOVERY VENTILATOR UNIT" ("Appl-1"); U.S. patent application Ser. No. 13/274,587 by McKie et al., entitled, "SENSOR MOUNTING PANEL FOR AN ENERGY RECOVERY VENTILATOR UNIT" ("APPL-2"); and U.S. patent application Ser. No. 13/274,629, by McKie et al., entitled, "DESIGN LAYOUT FOR AN ENERGY RECOVERY VENTILATOR SYSTEM" ("Appl-3"), which are all filed on the same date as the present application, and, which are incorporated herein by reference in their entirety. One or more of the above applications may describe embodiments of Energy Recovery Ventilator Units and components thereof that may be suitable for making and/or use in some of the embodiments described herein.

TECHNICAL FIELD

This application is directed, in general, to space conditioning systems and methods for conditioning the temperature and humidity of an enclosed space using an energy recovery ventilator.

BACKGROUND

Energy recovery ventilator units are often used in space conditioning systems to maintain air quality while minimizing energy losses. Currently, there is a lack of energy recovery ventilator units that can provide a high fresh-air proportion without using a single large diameter energy exchange enthalpy wheel. A large diameter enthalpy wheel adds to the foot-print, size, weight, and cost of the cabinet to house a large wheel. Consequently, existing energy recovery ventilator units can have poor compatibility with smaller (e.g., less than 20 tons) roof-top air handling units.

SUMMARY

One embodiment of the present disclosure is an energy recovery ventilator unit. The unit comprises a cabinet and a plurality of enthalpy wheels mounted in the cabinet. Major surfaces of each of the enthalpy wheels are substantially separated from each other and substantially perpendicular to a direction of primary forced-air intake into the cabinet. The major surface of one of the enthalpy wheels substantially overlaps, in the direction of primary forced-air intake, with the major surface of at least one of the other enthalpy wheels.

Another embodiment of the present disclosure is a method of assembling an energy recovery ventilator unit. The method comprises providing a cabinet and mounting a plurality of enthalpy wheels in the cabinet. Major surfaces of each of the enthalpy wheels are substantially perpendicular to a direction of primary forced-air intake into the cabinet. The major surface of one of the enthalpy wheels substantially overlaps, in the direction of primary forced-air intake, with the major surface of at least one of the other enthalpy wheels.

BRIEF DESCRIPTION OF THE DRAWINGS

Reference is now made to the following descriptions taken in conjunction with the accompanying drawings, in which.

DETAILED DESCRIPTION

The term, "or," as used herein, refers to a non-exclusive or, unless otherwise indicated. Also, the various embodiments described herein are not necessarily mutually exclusive, as some embodiments can be combined with one or more other embodiments to form new embodiments.

Figure 1:
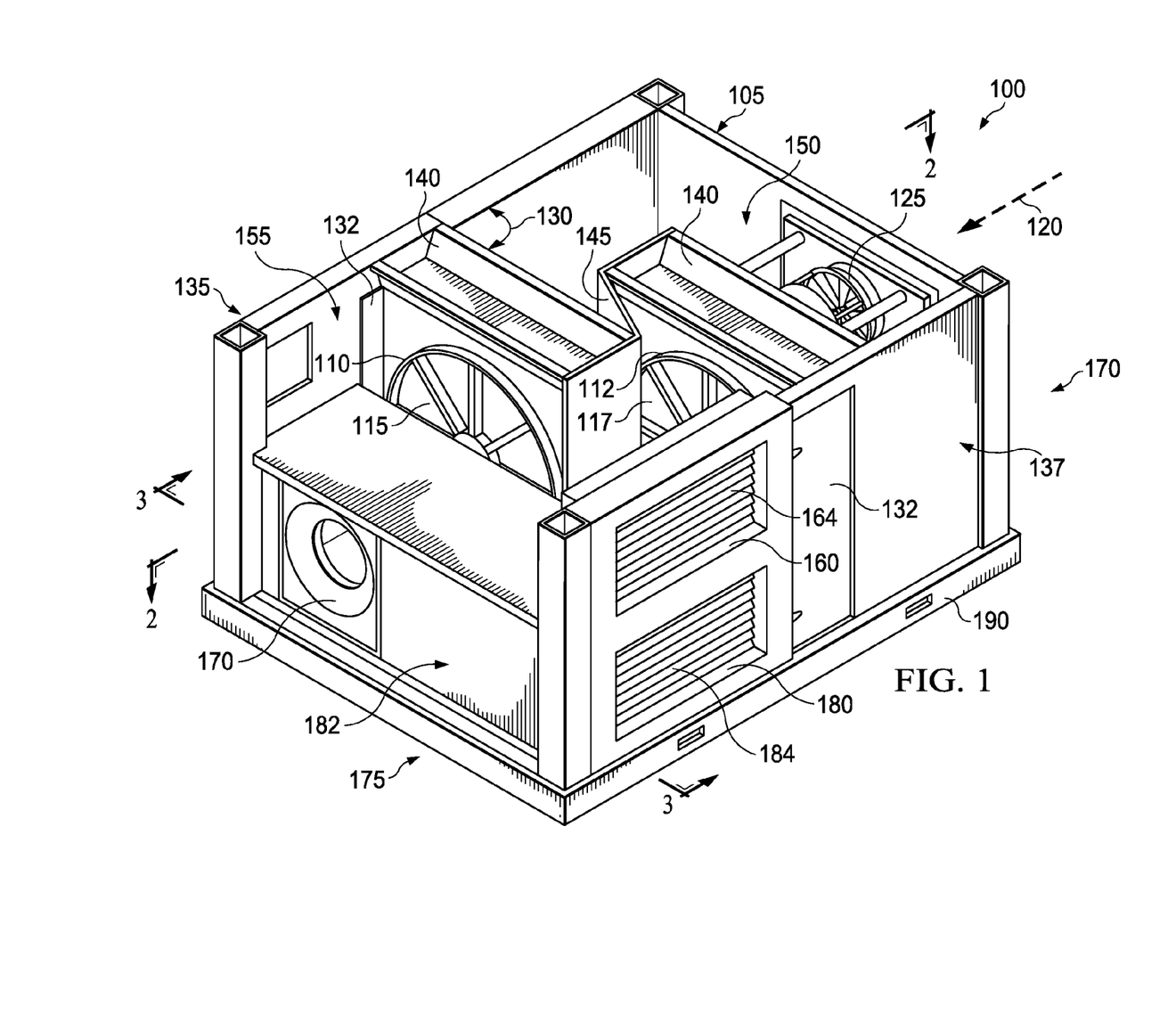
FIG. 1 presents a three-dimensional view of an example energy recovery ventilator unit of the disclosure.
Figure 2:
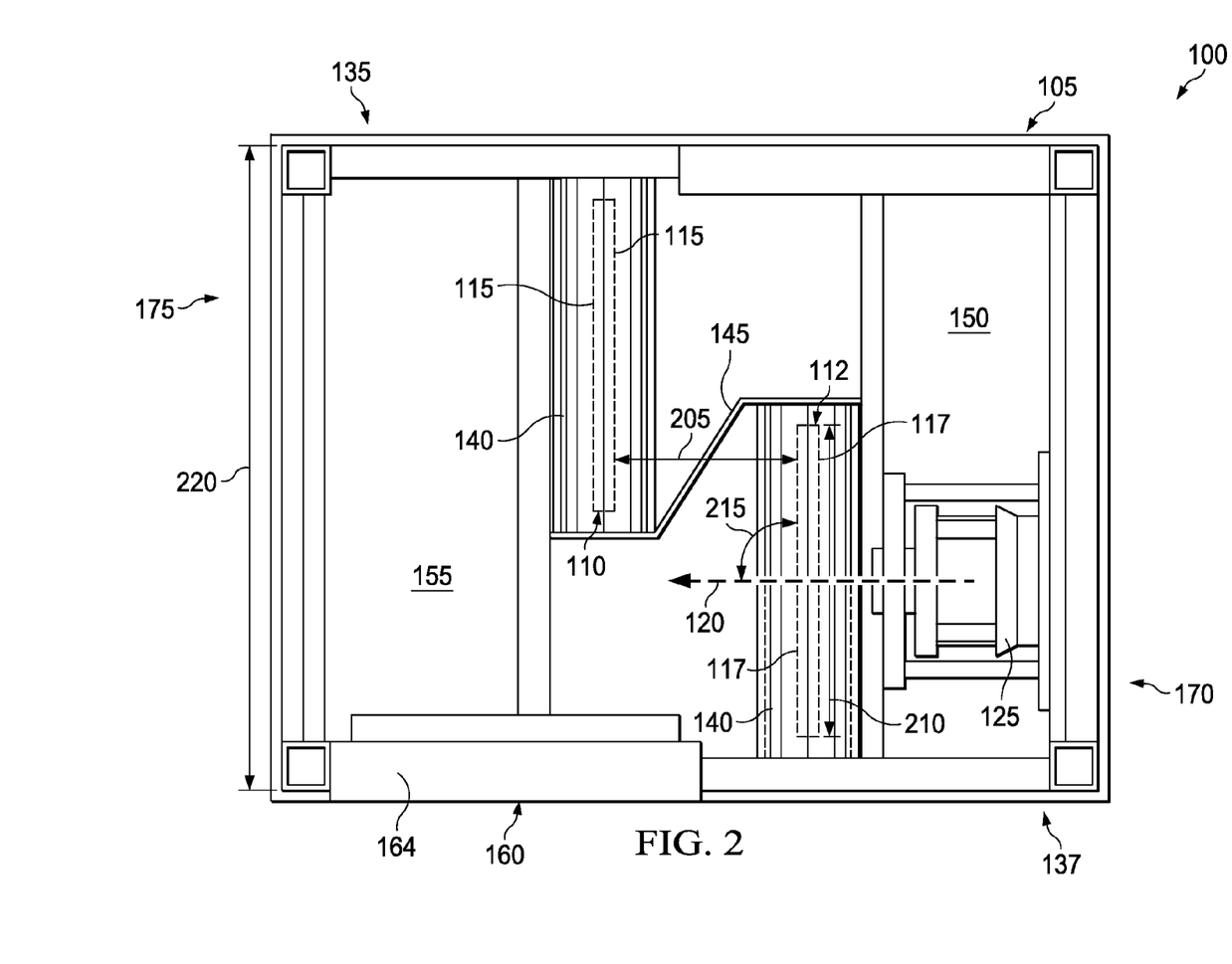
FIG. 2 presents a plan view of the example energy recovery ventilator unit presented in FIG. 1, along view line 2 as shown FIG. 1.
Figure 3:
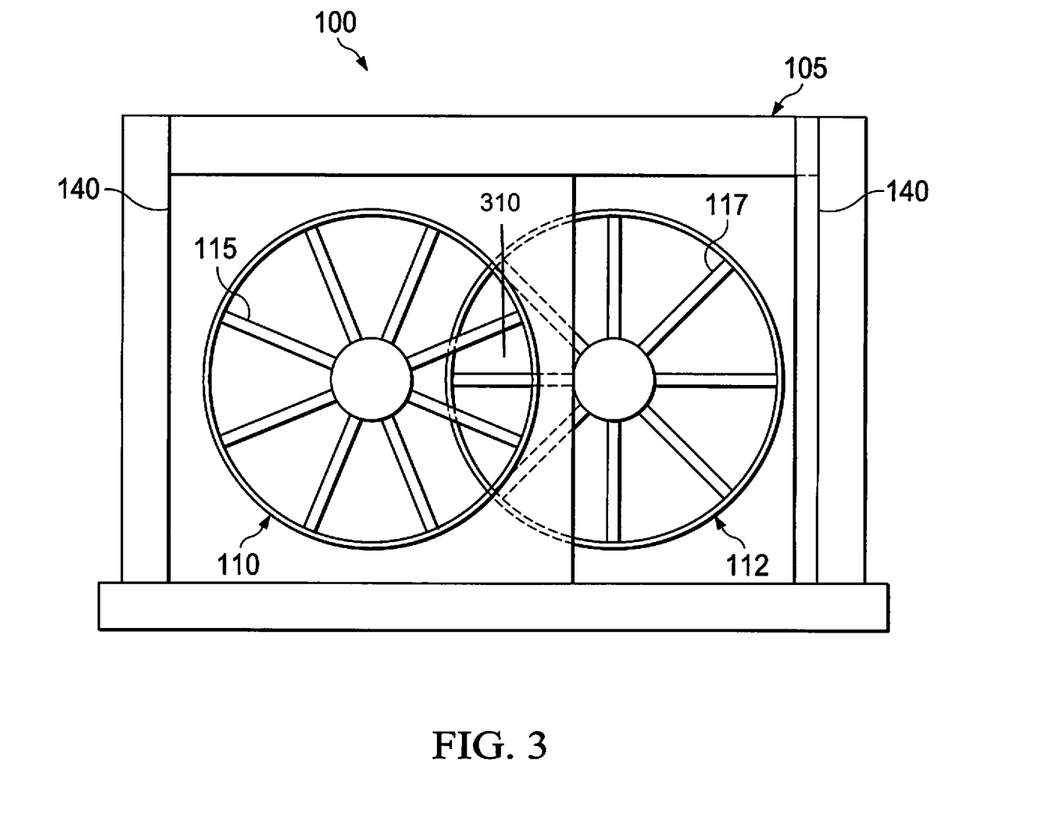
FIG. 3 presents a side of a selected portion the example energy recovery ventilator unit presented in FIG. 1, along view line 3 as shown FIG. 1.

One embodiment of the present disclosure is an energy recovery ventilator unit. FIG. 1 presents a three-dimensional view of an example energy recovery ventilator unit 100 of the disclosure. FIG. 2 presents a plan view of the example energy recovery ventilator unit 100 presented in FIG. 1, along view line 2 as shown FIG. 1. FIG. 3 presents a side of a selected portion the example energy recovery ventilator unit 100 presented in FIG. 1, along view line 3 as shown FIG. 1. Some exterior portions of a cabinet 105 are not shown in these figures so that the features within the cabinet 105 can be more clearly depicted.

As illustrated in FIG. 1, the energy recovery ventilator unit 100 comprises a cabinet 105 and a plurality of enthalpy wheels 110, 112 mounted in the cabinet 105, The wheels 110, 112 are mounted such that major surfaces 115, 117 of each of the enthalpy wheels 110, 112 are substantially perpendicular to a direction 120 of primary forced-air intake into the cabinet 105 (e.g., via an intake blower 125), and, the major surface 115 of one of the enthalpy wheels (e.g., one of surface 115 or surface 117, of one of the wheels 110, 115) substantially overlaps, in the direction 120 of primary forced-air intake, with the major surface of at least one of the other enthalpy wheels (e.g., the other one of the surfaces 115, 117 of the other of wheels 110, 112).

Mounting the wheels 110, 112 so that their major surfaces 115, 117 substantially overlap facilitates housing the wheels in a smaller-sized cabinet 105 than otherwise possible when using a single wheel, or, when using plurality of side-by-side wheels. It is surprising that such a configuration can be used to obtain desirable levels of energy recovery because of the perception that off-setting and overlapping the wheels in this fashion would have negative effects of airflow distribution on energy transfer. For instance, certain commercial suppliers of enthalpy wheels supplier recommend a maximum overlap of no more that 15 percent to avoid negative effects of air-flow distribution on energy transfer.

As part of the present disclosure, however, it was discovered that by substantially separating the enthalpy wheels 110, 112 from each other, negative air-flow distribution effects can be minimized, resulting in little to no loss in energy recovery effectiveness as compared to unit with a single wheel, or of side-by-side wheels, having major surfaces of comparable total area.

An additional benefit is that in some cases, the total cost of the plurality of the smaller-diameter wheels 110, 112 can be less than the cost of a single large wheel. Moreover, the individual weight of smaller-diameter wheels can be low enough that that single installer can pick up and move the wheel around, thereby reducing the cost of servicing or installing the unit 100. Also, the use of a plurality of wheels 110, 112 may provide a redundancy of function. For instance, if one wheel becomes inoperable, one or more of the other wheels can still have some functionality, which may not the case when using a unit with a single wheel.

For the purposes of the present disclosure, the term substantially separated from each other, as used herein, means that the opposing major surface areas of two adjacent wheels 110, 112 are separated by a distance 205 (FIG. 2), in the direction 120 of primary air intake, that is far enough apart that a desired airflow rate through the cabinet 105 (e.g., about 4000 cubic feet per minute, in some embodiments) can be achieved without have to expend more than 125 percent of the power to achieve the same airflow rate for a cabinet design having a single wheel, or side-by-side wheel, configurations with major surfaces of comparable total area. One skilled in the art, based on the present disclosure, would appreciate that the specific distance 205 separating two adjacent wheels 110, 112 would depend on the extent of overlap between the wheels 110, 112 and the desired airflow rate.

In some embodiments, the enthalpy wheels 110, 112 are separated, in the direction 120 of primary forced-air intake, by the distance 205 equal to or greater than one-third of a diameter 210 of two adjacent ones of the enthalpy wheels 110, 112. For example, in some embodiments of the unit 100, two of the enthalpy wheels 110, 112 have a same diameter 210 of about 35 inches. In such cases, the two wheels 110, 112 can be separated by a distance 205 of about 12 or more inches. In embodiments where there are two wheels of different diameters, then the separation distance 205 can be equal to or greater than the about one-third of the smallest diameter wheel of the two adjacent wheels.

For the purposes of the present disclosure, the term substantially perpendicular to the direction of primary forced-air intake, as used herein, means that the average direction 120 of forced air from the intake blower 125 in the cabinet 105 forms an angle 215 with respect to the major surfaces 115, 117 that equals about 90 degrees±20 degrees.

For the purposes of the present disclosure, the term substantially overlap, as used herein, means that there is greater than 15 percent overlap between either of the major surfaces 115, 117 of adjacent pairs of the enthalpy wheels 110, 112 which overlap in the direction 120 of forced airflow. For instance, as shown in FIG. 3, if the total area of the major surfaces 115, 117 of two same-sized wheels each equals 100 arbitrary area units of measure, then more than 15 area units of measure are in an overlap zone 310 for either of the wheels 110, 112. For instance, in some embodiments of the unit 100, the major surface areas 115, 117 of two of the enthalpy wheels 110, 112 overlap by up to about 50 percent of the total area of either of the enthalpy wheel's major surfaces 115, 117. Moreover in some such embodiments, the separation distance 205 can be equal to or greater than one-third of a diameter 210 of same-sized wheels 110, 112.

As illustrated in FIG. 1, in some embodiments, the major surfaces 115, 117 of each of the enthalpy wheels 110, 112 are vertically oriented in the cabinet 105, and, the wheels 110, 112 are arranged substantially parallel to each other. For instance, the major surfaces 115, 117 of the wheels 110, 112 are substantially perpendicular (e.g., forming an angle 130 of 90±10) with respect to sidewalls 135, 137 of the cabinet 105.

Having such a vertical orientation and parallel arrangement can facilitate removal of the enthalpy wheels 110, 112, from the cabinet 105 for cleaning or replacement, e.g., by sliding the wheels 110, 112 out of the cabinet (e.g., by sliding the each wheel through one or more service doors 132), without having to lift the wheels 110, 112 or to remove more than one wheel at a time, such as the case for certain tilt-mounted wheel configurations (e.g., a so-called "V-bank" configuration) or side-by-side configurations. Additionally, the casings 140 used to hold the vertically orientated and parallel arranged wheels 110, 112 can have less parts and be easier to manufacture than assemblies that hold wheels in a tilted configuration in a cabinet.

As further illustrated in FIGS. 1 and 2, in some embodiments each of the enthalpy wheels 110, 112 are housed in their own casings 140, and, a partitioning wall 145 connects the casings 140 together to form an air-tight and moisture-tight seal in the cabinet 105. That is, the partitioning wall 145 is configured to be sealed such that air and moisture can only travel through the enthalpy wheels 110, 112 from one zone (e.g. an intake zone 150) to another zone (e.g., a supply zone 155), in the cabinet 105. As illustrated in FIG. 2, in some cases, the enthalpy wheels 110, 112, and the partitioning wall 145, after being connected together through the wall 145, form a Z-shaped, or transposed Z-shaped, pattern that is recognizable from certain overhead views of the unit 100. However, embodiments of the unit 100 are not necessarily limited to having such patterns.

Figure 4:
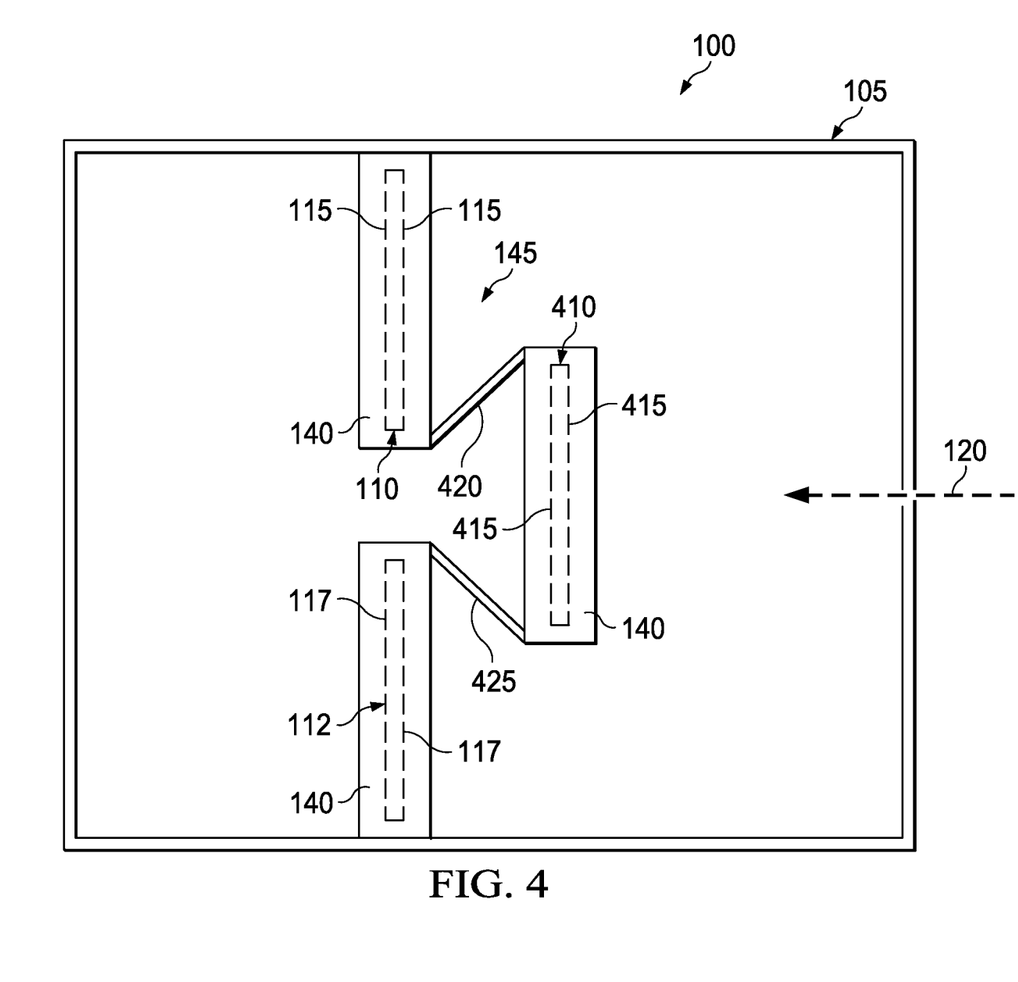
FIG. 4 presents a plan view of an alternative example energy recovery ventilator unit that is analogous to the view in presented in FIG. 2, but having have more than two wheels.
Figure 5:
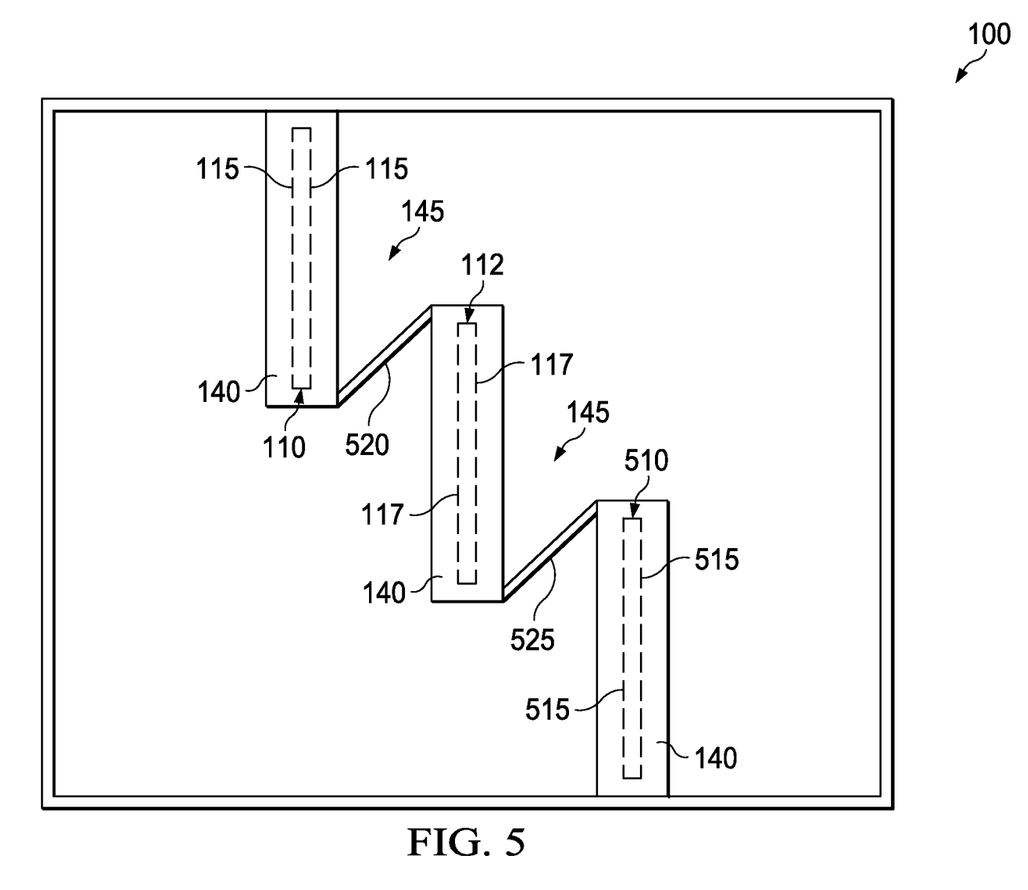
FIG. 5 presents a plan view of another alternative example energy recovery ventilator unit that is analogous to the view in presented in FIG. 2, but having have more than two wheels.

FIG. 4 presents a plan view of an alternative example energy recovery ventilator unit 100 that is analogous to the view presented in FIG. 2, but having more than two wheels. As illustrated in FIG. 4 the unit 100 has three enthalpy wheels 110, 112, 410. The major surface areas (e.g., surface area 415), of one of the enthalpy wheels (e.g., wheel 410) substantially overlaps with major surface areas 115, 117 of two other ones of the enthalpy wheels 110, 112, in the direction 120 of forced-air intake. In such embodiments the partitioning wall 140 could have two separate parts: a first part 420 connecting the first wheel 110 and the third wheel 410, and a second part 425 connecting the second wheel 112 and the third wheel 410. As illustrated in FIG. 4, not all of wheels (e.g., the two side-by-side wheels 110, 112) have to overlap with each other, In some cases, to help reduce the size of cabinet 105 it can be advantageous for all three of the wheels 110, 112, 410 to overlap with each other. For instance, as illustrated in FIG. 5, the unit 100 could have three wheels 110, 112, 510, and, major surfaces 115, 117, 515 of all three wheels 110, 112, 510 overlap with each other. Adjacent pairs of the enthalpy wheels (e.g., wheels 110, 112, and, wheels 112, 510) are connected to each other by two separate parts 520, 525 of the partitioning wall 140.

As noted above, mounting the enthalpy wheels so that their major surfaces substantially overlap facilitates the use of smaller-sized cabinets. For example as illustrated in FIG.

2, in some embodiments, a width 220 of the cabinet 105 is less than two-thirds of the sum of diameters 210 of the enthalpy wheels 110, 112. Consider, e.g., an embodiment of the unit 100 having two enthalpy wheels 110, 112 and the major surfaces 115, 117 of the two wheels 110, 112 overlap by about 50 percent. In such embodiments, the cabinet 105 can have a width 220 that is about 60 percent of the sum of the diameters 210 of the two wheels 110, 112. For instance, when the wheels 110, 112 both have a diameter 210 of about 35 inches, then the cabinet's width 220 can be about 47 inches. This can be a substantial reduction in cabinet width compared to some single wheel configurations, such as, e.g., a single 44-inch diameter wheel mounted in a 70-inch wide cabinet.

Mounting the enthalpy wheels so that their major surfaces substantially overlap with each other can also facilitate the placement of a secondary intake opening 160 to the supply zone 155 of the cabinet 105. Under certain favorable ambient outdoor conditions, the secondary intake opening 160 can provide free-cooling to a conditioned space without having to expended energy to force air through the enthalpy wheel 110, 112 via the intake blower 125. Space for the secondary intake opening 160 in the supply zone 155 can be created, without increasing the cabinet's size, by mounting one wheel 110 to an opposite sidewall 135 of the cabinet 105 as the sidewall 137 that the secondary intake opening 160 is located in. Such a configuration advantageously avoids having to increase the vertical height or horizontal width of the cabinet 105 to accommodate the opening 160.

The secondary intake opening 160 is configured to provide a controlled delivery of outside air to the supply zone 155. For example, the secondary opening 160 can be covered with an air control assembly 164 (e.g., including baffles or other adjustable air-restriction structure) configured to regulate the amount of air allowed though the secondary intake opening 160.

In some embodiments, as shown in FIG. 1, the intake blower 125 can be located on one end of the cabinet 105, and, a return blower 170 can be located on an opposite end 175 of the cabinet 105. Such a configuration can facilitate efficient air flow through the unit 100, as well as facilitate the placement of the secondary intake opening 160 in a sidewall 137 of the cabinet 105.

As further illustrated in FIGS. 1-2, some embodiments of the unit 100 further include a secondary return exhaust opening 180 that enters into a return zone 182 of the cabinet 105. The secondary return exhaust opening 180 allow return air from a conditioned space to be expelled from the unit without having to expended energy to force air through the enthalpy wheel 110, 112 via the return blower 170. The secondary return exhaust opening 180 can be covered with an air control assembly 184 (e.g., baffles or other adjustable air-restriction mechanisms) configured to regulate the amount of air allowed though the secondary exhaust opening 180.

In some embodiments to facilitate servicing, the secondary intake opening 160 and secondary return exhaust opening 180 are formed in the same sidewall 137 of the cabinet 105.

Figure 6:
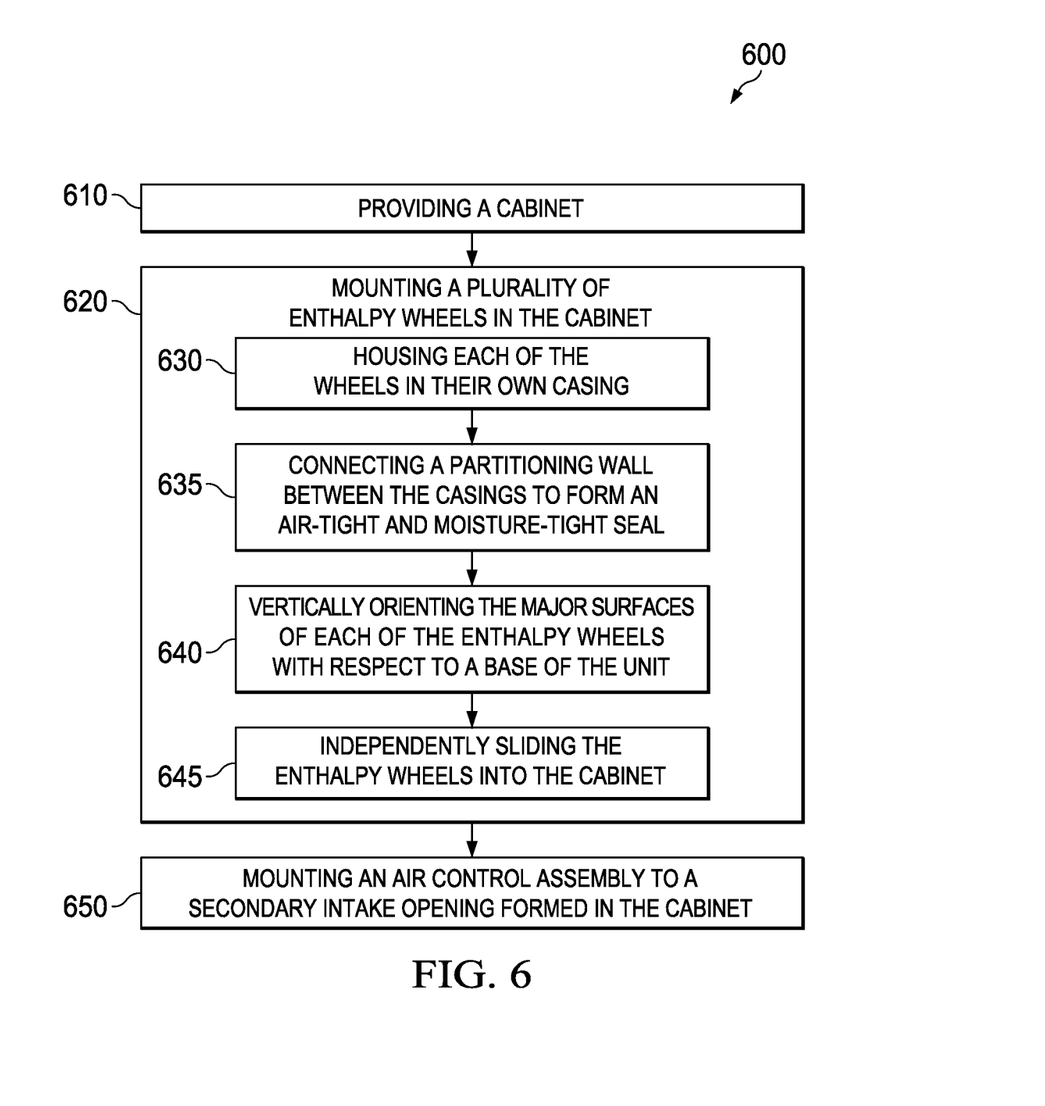
FIG. 6 presents a flow diagram of an example method of manufacturing an energy recovery ventilator unit of the disclosure, including any of the example embodiments discussed in the context of FIGS. 1-5.

Another embodiment of the present disclosure is a method of manufacturing an energy recovery ventilator unit, such as any of the units 100 discussed in the context of FIGS. 1-5. FIG. 6 presents a flow diagram of an example method 600 of manufacture.

With continuing reference to FIGS. 1-5 throughout, the example method 600 comprises a step 610 of providing a cabinet 105. For example, steel walls 135, 137 can be covered with a thermal insulation material and coupled together (e.g., via welds or fasteners) to form an airtight- and moisture-tight seal, as part of providing the cabinet in step 610.

The method 600 further comprises a step 620 of mounting a plurality of enthalpy wheels 110, 112 in the cabinet 105 such that major surfaces 115, 117 of each of the enthalpy wheels 110, 112 are substantially perpendicular to a direction 120 of primary forced-air intake into the cabinet 105. Additionally, the mounting is such that the major surface 115, 117 of one of the enthalpy wheels 110, 112 substantially overlaps, in the direction 120 of primary forced-air intake, with the major surface 115, 117 of at least one the other enthalpy wheels 115, 117.

In certain embodiments of the method 600, mounting the wheels 110, 112 in step 620, can include a step 630 of housing each of the wheels in their own casing 140. In some embodiments, the wheels 110, 112 can be housed in their own casings 140 before being mounted in the cabinet 105. That is, the wheel 110 and casing 140 are together mounted in the cabinet 105 as part of step 620. In other cases, the wheels 110, 112 can be housed in a casing 140 that is already installed in the cabinet 105. That is, the wheel is separately mounted in the cabinet 105.

In some embodiments of the method 600, mounting the enthalpy wheels 110, 112 in step 620 further includes a step 635 of connecting a partitioning wall 145 between the casings 140 to form an air-tight and moisture-tight seal.

In some embodiments of the method 600, the mounting step 620 can include a step 640 of vertically orienting the major surfaces 115, 117 of each of the enthalpy wheels 110, 112 with respect to a base 190 (e.g., a planar base platform) of the unit 100.

In some embodiments of the method 600, mounting the enthalpy wheels 110, 112 in step 620, can further include a step 645 of independently sliding the enthalpy wheels 110, 112 into the cabinet 105. That is, any of the wheels 110, 112 can slide into or out of the cabinet 105 without having to remove or move any of the other wheels. To facilitate sliding, in some cases, the casings 140 housing each wheel 110, 112 can have support wheels or rollers.

Some embodiments of the method 600 can further include a step 650 of mounting an air control assembly 164 to a secondary intake opening 160 formed in the cabinet 105, wherein the secondary intake opening 160 is configured to provide a controlled delivery of outside air to a supply zone 155 of the cabinet 105 which bypasses the enthalpy wheels 110, 112.

Those skilled in the art to which this application relates will appreciate that other and further additions, deletions, substitutions and modifications may be made to the described embodiments.

The invention claimed is:

1. An energy recovery ventilator unit, comprising:
a cabinet;
a plurality of enthalpy wheels mounted in the cabinet such that major surfaces of each of the enthalpy wheels are separated from each other and perpendicular to a direction of primary forced-air intake into the cabinet, and, the major surface of one of the enthalpy wheels overlaps, in the direction of primary forced-air intake, with the major surface of at least one of the other enthalpy wheels;
an intake zone located at one end of the cabinet comprising an intake blower configured to facilitate airflow through the enthalpy wheels;

a supply zone located at a second end of the cabinet distal to the intake zone;

a return zone proximate the supply zone and comprising a return blower configured to facilitate airflow through the enthalpy wheels;

a plurality of partitioning walls positioned between the overlapping portions of the plurality of enthalpy wheels configured to form an air-tight and moisture-tight seal, and configured such that air and moisture is split into separate flow paths so that the individual air streams can only travel through one of the enthalpy wheels when traveling from the intake zone to the supply zone; and a side wall, the side wall comprising a service door, the service door operable to allow the removal of at least one of the enthalpy wheels from the cabinet, the service door comprising;

a secondary intake opening to the supply zone within the cabinet, wherein the secondary intake opening is configured to provide a controlled delivery of outside air to the supply zone, the secondary intake opening located downstream of one of the plurality of enthalpy wheels in a path of forced air from the intake blower.

2. The unit of claim 1, the service door further comprising;

a return exhaust opening to the return zone within the cabinet, wherein the return exhaust opening is proximate the secondary intake opening and is operable to allow return air from a conditioned space to be expelled from the unit without having to expend energy to force air through the enthalpy wheels via the return blower.

3. The unit of claim 1, wherein two of the enthalpy wheels have a same diameter of about 35 inches and the two wheels are separated, in the direction of primary air intake, by a distance of about 12 or more inches.

4. The unit of claim 1, wherein the major surface areas of two of the enthalpy wheels overlap by up to 50 percent of the total area of either of the enthalpy wheel's major surface.

5. The unit of claim 1, wherein the major surfaces of each of the enthalpy wheels are vertically oriented in the cabinet and are arranged parallel to each other.

6. The unit of claim 1, wherein there the enthalpy wheels all have a same diameter.

7. The unit of claim 1, wherein each of the enthalpy wheels are housed in their own casings, and, a partitioning wall connects the casings together to form the air and moisture tight seal.

8. The unit of claim 1, wherein the major surface areas of all of the enthalpy wheels overlap with each other.

9. The unit of claim 1, wherein a width of the cabinet is less than two-thirds of the sum of diameters of the enthalpy wheels.

10. The unit of claim 1, wherein there are two of the enthalpy wheels, the major surfaces of the two wheels overlap by about 50 percent and the cabinet has width that is about 60 percent of the sum of the diameters of the two wheels.

11. The unit of claim 1, further including an air control assembly covering the secondary intake opening, wherein the air control assembly is configured to control the delivery of outside air through the secondary intake opening.

\* \* \* \* \*